United States Patent

Li

[11] Patent Number: 6,011,506
[45] Date of Patent: Jan. 4, 2000

[54] DIFFERENT MODELS FOR RF SIGNAL TRAIN GENERATORS AND INTERFEROCEIVERS

[76] Inventor: Ming-Chiang Li, 11415 Bayard Dr., Mitchellville, Md. 20721

[21] Appl. No.: 08/352,190

[22] Filed: Dec. 1, 1994

Related U.S. Application Data

[63] Continuation-in-part of application No. 08/185,177, Jan. 24, 1994, Pat. No. 5,589,929, and application No. 08/018,388, Feb. 17, 1993, abandoned.

[51] Int. Cl.⁷ .............. G01S 7/483; G01S 7/40; G01C 3/08
[52] U.S. Cl. .............. 342/54; 356/5.01; 356/345; 342/172; 342/175
[58] Field of Search .............. 342/54, 169, 170, 342/171, 172, 175; 356/5.01–5.15, 345, 28.5; 367/127, 149

[56] References Cited

U.S. PATENT DOCUMENTS

| | | | |
|---|---|---|---|
| 5,144,468 | 9/1992 | Weverka | 359/173 |
| 5,294,930 | 3/1994 | Li | 342/13 |
| 5,296,860 | 3/1994 | Li | 342/58 |
| 5,313,266 | 5/1994 | Keolian et al. | 356/345 |
| 5,319,438 | 6/1994 | Kiasaleh | 356/345 |
| 5,331,453 | 7/1994 | Lipsky | 359/191 |
| 5,381,426 | 1/1995 | Fontana et al. | 372/18 |
| 5,422,966 | 6/1995 | Gopalakrishnan et al. | 385/2 |
| 5,424,863 | 6/1995 | Gertel | 359/173 |
| 5,430,569 | 7/1995 | Blauvelt et al. | 359/162 |
| 5,434,877 | 7/1995 | Chung | 372/32 |
| 5,442,720 | 8/1995 | Shaw | 385/16 |
| 5,589,929 | 12/1996 | Li | 356/5.01 |

*Primary Examiner*—John B. Sotomayor

[57] ABSTRACT

Interferoceivers are apparatus which use optical fiber loop based radio frequency (RF) signal train generators to store transient pulses and regenerate their identical replicas for analysis. The present invention further advances the art of RF signal train generators and interferoceivers in investigating acoustical, electromagnetic, and optical transient phenomena. The disclosure includes mechanisms for tuning the interferoceivers, and means for forming synthetic images with chaotic pulses or pulses of opportunity.

20 Claims, 7 Drawing Sheets

DIFFERENT MODELS FOR RF SIGNAL TRAIN GENERATORS AND INTERFEROCEIVERS

This is a Continuation-In-Part of the applications:
appn. Ser. No.: 08/185,177
Filing Date: Jan. 24, 1994
Applicant: Ming-Chiang Li
Appn. Title: RF Signal Train Generator and Interferoceivers now U.S. Pat. No. 5,589,929
appn. Ser. No.: 08/018,388
Filing Date: Feb. 17, 1993
Applicant: Ming Chiang Li
Appn. Title: Optical Fiber Based Radars now abandoned.
Other Patents and Publications
"Optical RF Stereo," Ming-Chiang Li, U.S. Pat. No. 5,294,930, Date of patent Mar. 15, 1994.
"Optical Fiber Based Bistatic Radar," Ming-Chiang Li, U.S. Pat. No. 5,296,860, Date of patent Mar. 22, 1994.
"Cross Beam Experiments and ERP Paradox," in Proceedings of the First International Conference on Coherent States: Past, Present, and Future, Knoxville, Tenn., (Jun. 14–17, 1993), Eds. D, H. Feng, J. R. Klauder, M. R. Strayer, World Scientific Publishing Co., Singapore (1994).
"Separated-Beam Experiments and Transit-Time Broadening," Ming-Chiang Li, Phys. Rev. A 23, 2995 (1981).
"Resonance Fringes in the Two-Photon Absorption with a Doppler Shift," Ming-Chiang Li, Phys. Rev. A 22, 1323 (1980).
"Doppler-Free Two-Photon Absorption of Two Coherent Beams," Ming-Chiang Li, Phys. Rev. A 16, 2480 (1977).
"Atomic Absorptions of Two Coherent Light Beams," Ming-Chiang Li, Nuovo Cimento 39B, 165 (1977).
"Scattering of Two Coherent Beams By Multiple Centers," Ming-Chiang Li, Phys. Rev. A 10, 781 (1975).
"Scattering Initiated by Two Coherent Beams," Ming-Chiang Li, Phys. Rev. A 9, 1635 (1974).

TECHNICAL FIELD OF INVENTION

This is a continuation in part of the pending inventions on the investigation of transient acoustical, electromagnetic, and optical phenomena without instability blurring. RF train generators and interferoceivers are capable of revealing all intrinsic traits of a transient event with a single pulse. The present invention further advances the art of RF signal train generators and interferoceivers.

HISTORY OF THE INVENTION

The history of the invention may be traced back twenty years ago, when the inventor was working on the scattering initiated by two coherent beams (1974). In conventional scattering experiments, we often use one single incident beam. An experiment with a single beam is not able to determine the phases of scattering amplitudes directly. This is the famous phase problem in physics. Experiments with two coherent beams on the other hand will lead to coherent scatterings, from which we can determine directly the phase of scattering amplitudes for a single scatterer.

In cases of scattering by multiple scatterers, complications arise. Random distributions and motions of these scatterers can wipe out the coherence and mask the phase information (1975). Restrictions have to be imposed on the distributions of scatterers in order to recover the coherence. The restrictions may vary according to the cases of interest. In one case, scatterers are regularly spaced. Atoms as scatterer are regularly spaced inside a crystal, then through a diffraction of two coherent beams, we can have a generic method in directly determining the phases of crystal diffraction amplitudes (1975). Our knowledge on various crystals is still limited even now. The discovery of high temperature super conductors in 1984 would not have come as such a surprise to most of us. If the crystal diffractions with two coherent beams were adopted experimentally.

The inventor later investigated the atomic processes initiated by two coherent laser beams. It was found that, in certain atomic processes, random atomic motions will not wipe out the coherence and mask the phase information (1977). Experiments were performed which led to high precision atomic spectroscopy for Doppler free two photon absorption processes (1977). It was later realized that Doppler free restriction can be removed (1980). In the atomic processes with random motions, one has to impose proper alignments between coherent laser beams in order to achieve coherence (1981, 1994).

The inventor was also interested in applying two coherent beam processes to radar and electronic intelligence gathering applications. An application of these kinds requires two spatially separated sites, and has to bring radio frequency (RF) signals from two sites together, or to split a radar signal for transmission at both sites. Having RF signals coherent at two widely separated sites is not simple. High attenuation makes coaxial cables and wave guides unsuitable. High environmental contamination prevents a direct open air RF link. With the recent advancement in optical fibers, the interested processes become possible. The inventor have already proposed two coherent beam processes of optical fiber based bistatic radar (U.S. Pat. No. 5,296,860), and optical RF stereo (U.S. Pat. No. 5,294,930). Experiments have further demonstrated the versatility of these inventions. The development of many new radar and electronic warfare systems is now underway.

Optical fiber based radars, RF signal train generator, and interferoceivers have extended coherent beam processes even further. The inventor's expertise gained through his research activities from 1977 to 1981 is especially important for leading to such development. An essential issue in these applications was to overcoming the random transient effects in preserving the coherence. The research activities from 1977 to 1981 have shown that random motion is not an impenetrable barrier in special atomic processes (1977). The success in the atomic processes has provided the inventor with a clue on the discovery of mechanisms, which are able to overcome the randomness for various other physical processes. Without his expertise, the inventor may not be able to conceive interferoceivers for deciphering the variational difference created by a single transient event.

A simple and brief review of the history on two coherent beam processes is presented. Anyone who is interested in the art should read the cited articles. Many efforts are still needed to advance the art of two coherent beam processes further. The parent and present applications a re part of the se efforts.

BACKGROUND OF THE INVENTION

An interferometer with a continuous wave or a pulse source requires both the interferometer and system under test to be stable and stationary. In the parent applications, we point out a need in the art for new apparatus which are capable of capturing the intrinsic traits of and determining the variational differences created by a random, chaotic, turbulent, or transient phenomenon without instability blurring. The RF signal train generator and interferoceivers proposed in the parent applications will be able to fulfil the need in the art.

An investigation of a random, chaotic, turbulent, or transient phenomenon requires a pulsed source, which may or may not be reproduced exactly. In the parent applications, we utilize only a single pulse from the source, whose reproducibility is not an issue. Embodiments of the parent inventions can be coupled with any sources, which may or may not be reproducible. We are always pressured by the need for simplification, that will lower the cost and make the operation of apparatus easier. If a stable source can be used in providing reference signals, then simplified models of interferoceivers exists. We are also motivated by the need for more sophistication. A transient pulse from the source or from the system under test may be statically recorded through analog or digital means. A use of static recording means will also lead to a different model, which can further advance the sophistication of interferoceivers.

We are further inspired by the need to adopt new and advanced technologies for improving our apparatus. As the technology evolves, interferoceivers also evolve with the technology. New architectures in designing interferoceivers will not only improve their performance, but also will enhance their functional capabilities. In the present invention, we will devote our efforts on some new models of RF signal train generators and interferoceivers.

SUMMARY OF THE INVENTION

Embodiments of the present invention will advantageously satisfy the above-identified need in the art and provide interferoceivers with new advanced architectures which are simpler, more sophisticated and versatile. In particular, the embodiments incorporate latest advancements in fiber optics, static digital and analog recording technologies to improve interferoceivers.

Preferred embodiments of the present invention depend on the performance and functional requirements of interferoceivers. Difference in requirements leads to different models. In a preferred embodiment for easy tuning and realignment of interferoceivers, an RF signal train generator would use a common optical delay loop for storage and reproduction of both reference and event pulse trains. This reduces the stringent condition on alignment of reproduced replicas. In a preferred embodiment for functional diversity and performance, an RF signal train generator would employ a tunable optical fiber RF delay loop. The electrical length of a delay loop will be able to vary continuously and interferoceivers acquire additional important capabilities. In a preferred embodiment for capturing rapid occurrence of transient events, static means would be employed to temporally record the events. The interferoceiver will then analyze the recorded events off-line. In a preferred embodiment for simplicity, the source in an interferoceiver would remain coherent during the entire duration from the pulse transmission to the replica processing at the RF receiver. A stable RF oscillator will be a source, which is capable of providing references to reproduced replicas. The reference optical delay loop is no longer required and the RF signal train generator is simplified.

BRIEF DESCRIPTION OF THE DRAWING

A complete understanding of the present invention may be gained by considering the following detailed description in conjunction with the accompanying drawings, in which.

DETAILED DESCRIPTION

Figure 1:
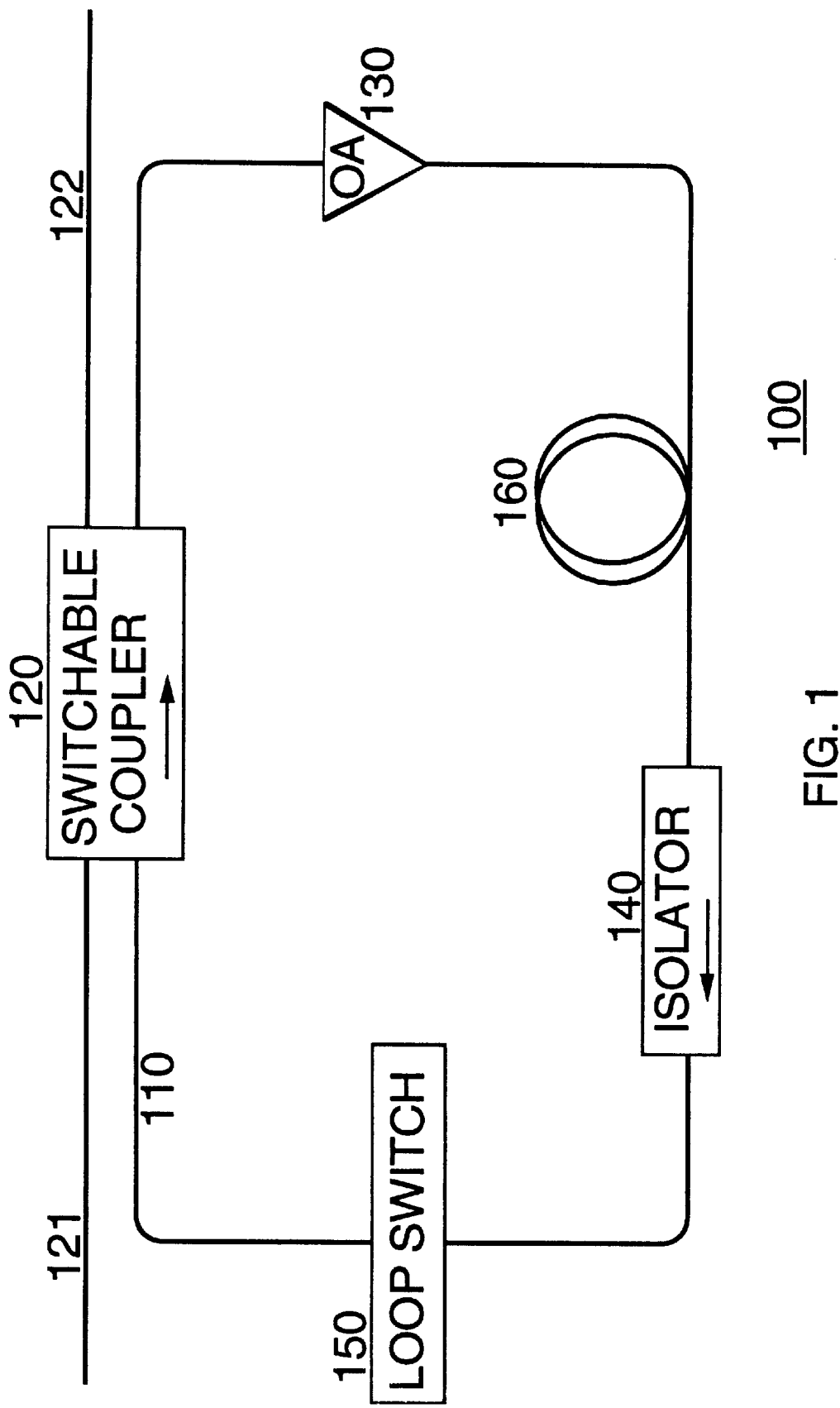
FIG. 1 shows a block diagram of a tunable optical fiber RF delay loop for use in fabricating embodiments of the present invention.

FIG. 1 shows a block diagram of a tunable optical fiber RF delay loop for use in fabricating embodiments of the present invention. Except a tunable optical fiber loop, it is the same optical fiber RF delay loop as in the parent patent applications of optical fiber based radars, RF signal train generator and interferoceivers. As shown in FIG. 1, the optical RF signals through optical fiber 121 are applied as input to switchable coupler 120. Switchable coupler 120 switches the optical RF signals from optical fiber 121 into optical fiber loop 110. Isolator 140 assures the optical RF signals in optical fiber loop circulating only in one direction. As the optical RF signals circulate the optical fiber loop 110, the strength of optical RF signals reduces. The reduction is compensated by in-line optical amplifier (OA) 130 to keep the optical RF signals circulating in the loop again and again until switchable coupler 120 is closed. A portion of optical RF signals is switched from optical fiber loop 110 to optical fiber 122 and the remainder of optical RF signals will still circulate in optical fiber loop 110. The steps repeat again and again. The closing of loop switch 150 will quench the circulation of optical RF signals in optical fiber loop 110 before admitting any new arrivals of optical RF signals from optical fiber 121. Switchable coupler 120, in-line optical amplifier 130, isolator 140 and loop switch 150 are well known to those of ordinary skill in the art.

Loop 160 denotes the tunable portion of optical fiber loop 110. As is well known to those of ordinary skill in the art, we may continuously vary the electrical length of an optical fiber through mechanical and electronic means. We apply these means to vary the electrical length of the tunable portion. A variation in tunable portion 160 will lead to a variation in the total electrical length of optical fiber loop 110. Beside mechanical and electronic means, we may use a widely wavelength-tunable laser and a dispersive fiber in varying the electrical length of optical fiber loop 110. As those of ordinary skill in the art will readily appreciate, many configurations are possible in fabricating embodiments of a tunable optical fiber RF delay loop.

Figure 2:
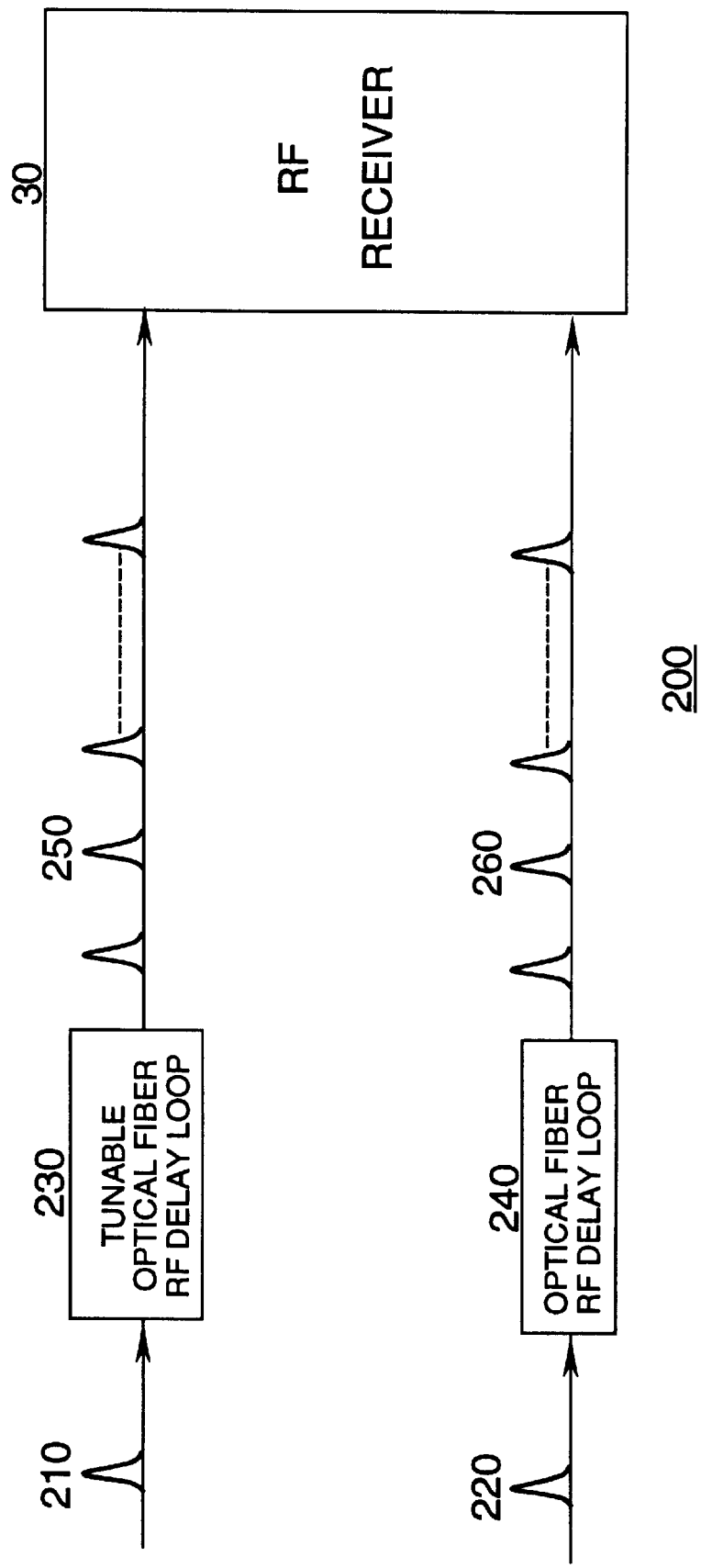
FIG. 2 shows a block diagram of an RF signal train generator, which comprises a tunable optical fiber RF delay loop, for use in fabricating embodiments of the present invention.

FIG. 2 shows a block diagram of an RF signal train generator 200 for use in fabricating embodiments of the present invention. Except a tunable optical fiber RF delay loop, it is the same RF signal train generator as in the parent patent application of optical fiber based radars, RF signal train generator and interferoceivers. RF signal train generator 200 comprises two optical fiber RF delay loops. The electrical length of these two delay loops are nearly equal. It is depicted in FIG. 2 that one delay loop is tunable and other is not. As those of ordinary skill in the art will readily appreciate, we may use both tunable delay loops to fabricate embodiments of RF signal train generator 200.

As shown in FIG. 2, two temporally aligned RF pulses 210 and 220 are applied as inputs to their respective optical fiber delay loops 230 and 240. So as not to loose clarity, optical fiber RF up and down converters, and low noise amplifiers have not been depicted in FIG. 2. Loops 230 and 240 are operated in the same manner thus respectively producing two RF pulse trains 250 and 260. As those of ordinary skill in the art will readily appreciate, pulses at RF pulse trains 250 and 260 are replicas of the original input RF pulses 210 and 220 respectively.

As those of ordinary skill in the art will further appreciate, embodiments of the present invention may not comprise an optical fiber RF storage subsystem as in comparison with optical fiber based radars for temporal alignment of two input pulses 210 and 220.

RF receiver (RFR) 30 uses direct digitizing and coherent receiving methods to process pulse trains 250 and 260 from RF signal train generator 200. These methods are well known to those of ordinary skill in the art. The direct digitizing method uses one train as triggering pulses to instruct the digitizer to sample the respective pulses of the second train. The triggering is systematically delayed in sampling the sequential pulses of the second train. The direct digitizing method yields the intrinsic structure of the initial pulse, which generates the second pulse train. It is well known to those of ordinary skill in the art that the systematic delay can be accomplished in RFR 30. As those of ordinary skill in the art will readily appreciate, with a tunable optical fiber RF delay loop, the systematic delay can now be accomplished through a tuning to the delay loop 230.

The coherent receiving method, based on the intra pulse coherence, uses the pulses of one train as reference to process variational differences of their respective pulses of the second train. The mechanism to achieve intra pulse coherence was proposed in the parent patent application of optical fiber based radars. The coherent receiving method yields the relative amplitudes and phases, or the relative frequency differences between RF pulses 210 and 220. Above teaching leads to an expression for the relative frequency differences as measured by RFR 30.

$$\sum_{n=1}^{N} A_1(t - n\tau - n\delta\tau) A_2(t - n\tau) \cos\{(\omega_1 - \omega_2)n\tau + \omega_1 n\delta\tau\}, \quad (1)$$

where $\omega_1$ and $\omega_2$ are the circular frequencies of RF pulses 210 and 220. $A_1(t-n\,\pi-n\,\delta\pi)$ and $A_2(t-n\,\pi)$ are their respective pulse profiles, where $\pi$ the time delay of the loop and $n\,\pi$ denotes the time delay of a RF pulse emerged from the delay loops after looping n times. N is the total number of pulses in each pulse train. $\delta\pi$ denotes a variation from tunable optical fiber RF delay loop. $\pi$ and $\delta\pi$ are both measurable quantities. From Eq. (1), we can accurately determine both the difference $\omega_1-\omega_2$ and carrier frequency $\omega_1$. As those of ordinary skill in the art will appreciate, embodiment 200 teaches us with new means for determine the carrier frequency of a single transient RF pulse. It is also true for profiles $A_1(t-n\,\pi-n\,\delta\pi)$ and $A_2(t-n\,\pi)$. As those of ordinary skill in the art will further appreciate, embodiment of RF signal train generator 200 will further advance the art of interferoceivers in function diversity and performance for investigating random, chaotic, turbulent, or transient features of emitting sources and systems under test.

As those of ordinary skill in the art will further appreciate, a knowledge of carrier frequency, coupled with time delay adjustment in aligning two input pulses at RF signal train generator, leads to a direct determination of the phase variation among these two pulses. The determination is an important finding in observing a transient phenomenon with spatially distributed multiple transducers, sensors, or antennas. Spatial distribution along with topological irregularities induces phase variations among pulses from these multiple devices. The variations have to be compensated in order to achieve the coherent observation of a single transient event with multiple devices. The determination leads to means for compensating the phase variations. These means are well known to those of ordinary skill in the art.

Figure 3:
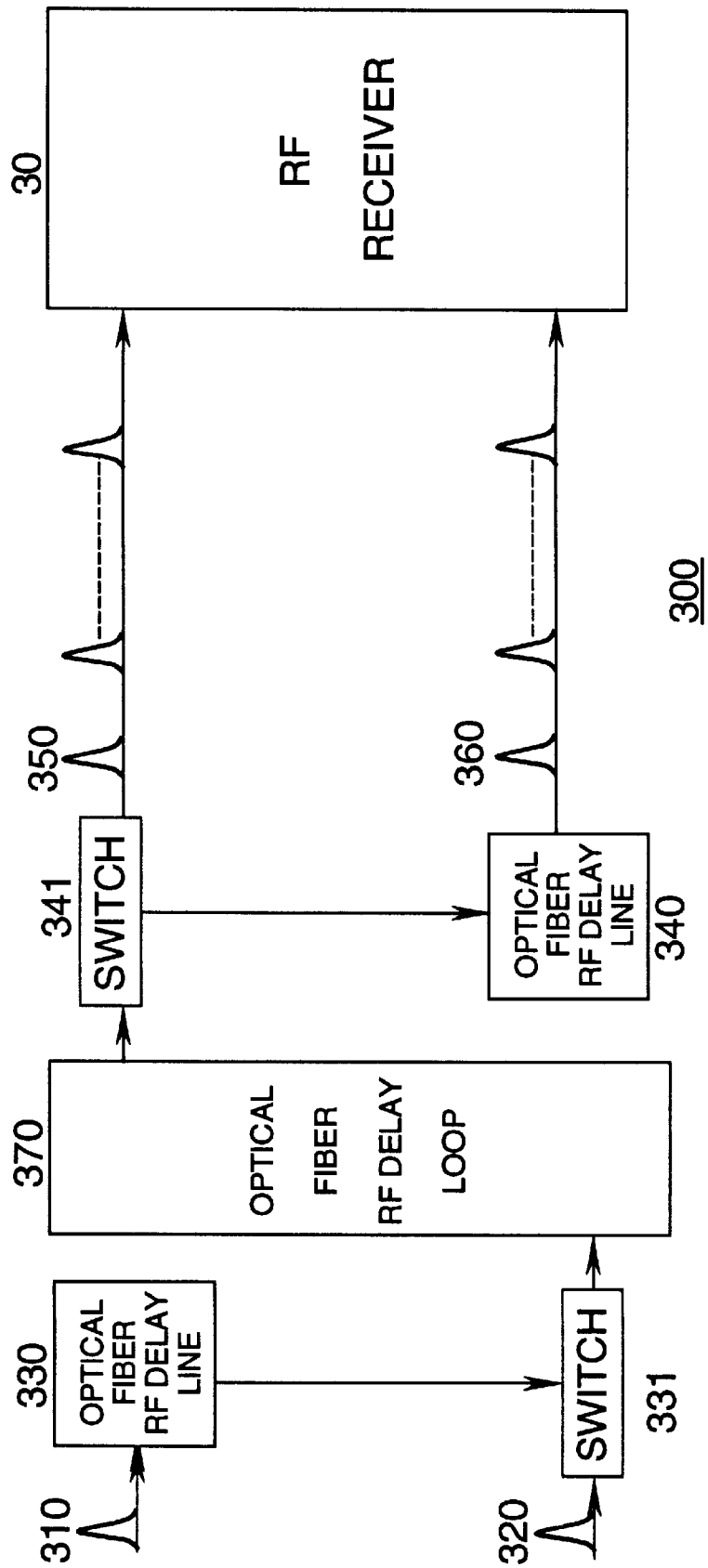
FIG. 3 shows a block diagram of an RF signal train generator, which comprises a common optical fiber RF delay loop, for use in fabricating embodiments of the present invention.

FIG. 3 shows a block diagram of an RF signal train generator, which comprises a common optical fiber RF delay loop, for use in fabricating embodiments of the present invention. Optical fiber RF delay lines 330 and 340 are identical. The time delays caused by both delay lines are the same. Switch 331 has two input ports and one output port. Two input ports are mutually exclusive. When one port is open, the other port is closed. Switch 341 is the same as switch 331 except ports being reversed. Switch 341 has one input port and two output ports instead.

As shown in FIG. 3, two input pulses 310 and 320 are temporally aligned. Switch 331 through one of its input ports, while second input port is closed, switches input pulse 320 into optical fiber RF delay loop 370. Optical fiber RF delay line 330 causes the delay of input pulse 310, then outputs the delayed pulse to switch 331. When delayed pulse 310 arrives, switch 330 closes first port and open second port to switch delayed pulse 310 into delay loop 370. The electrical length of delay loop 370 is large than the sum of pulse lengths for pulses 310 and 320, such that both pulses inside delay loop will not overlap. Delay loop 370 is the same loop as in the parent applications. When a portion of pulse 320 is switched out from delay 370, a portion of consecutively followed pulse 310 will be switched out in sequence. Switch 341 then switches the entire portion of pulse 320 from delay loop 370 through optical fiber RF delay line 340 into RF receiver 30. Sequentially switch 341 switches the entire portion of pulse 310 directly into RF receiver 30, without a leakage through delay line 340. The operation will be repeated again and again to generate RF pulse trains 350 and 360 from two input pulses 310 and 320 respectively.

Because optical fiber delay lines 330 and 340 are the same, and switches 331 and 341 are the same. Two temporally aligned input pulses 310 and 320 leads to aligned RF pulse trains 350 and 360. During an operation, environmental changes may affect electrical lengths of switches 331 and 341, delay lines 330 and 340, and delay loop 370. As those of ordinary skill in the art will readily appreciate, the changes will have very small effects on differences of electrical lengths. RF signal train generator 300 is stable with respect to environmental changes. One-loop RF signal train generator is more immune to environmental changes than that of two-loops.

Figure 4:
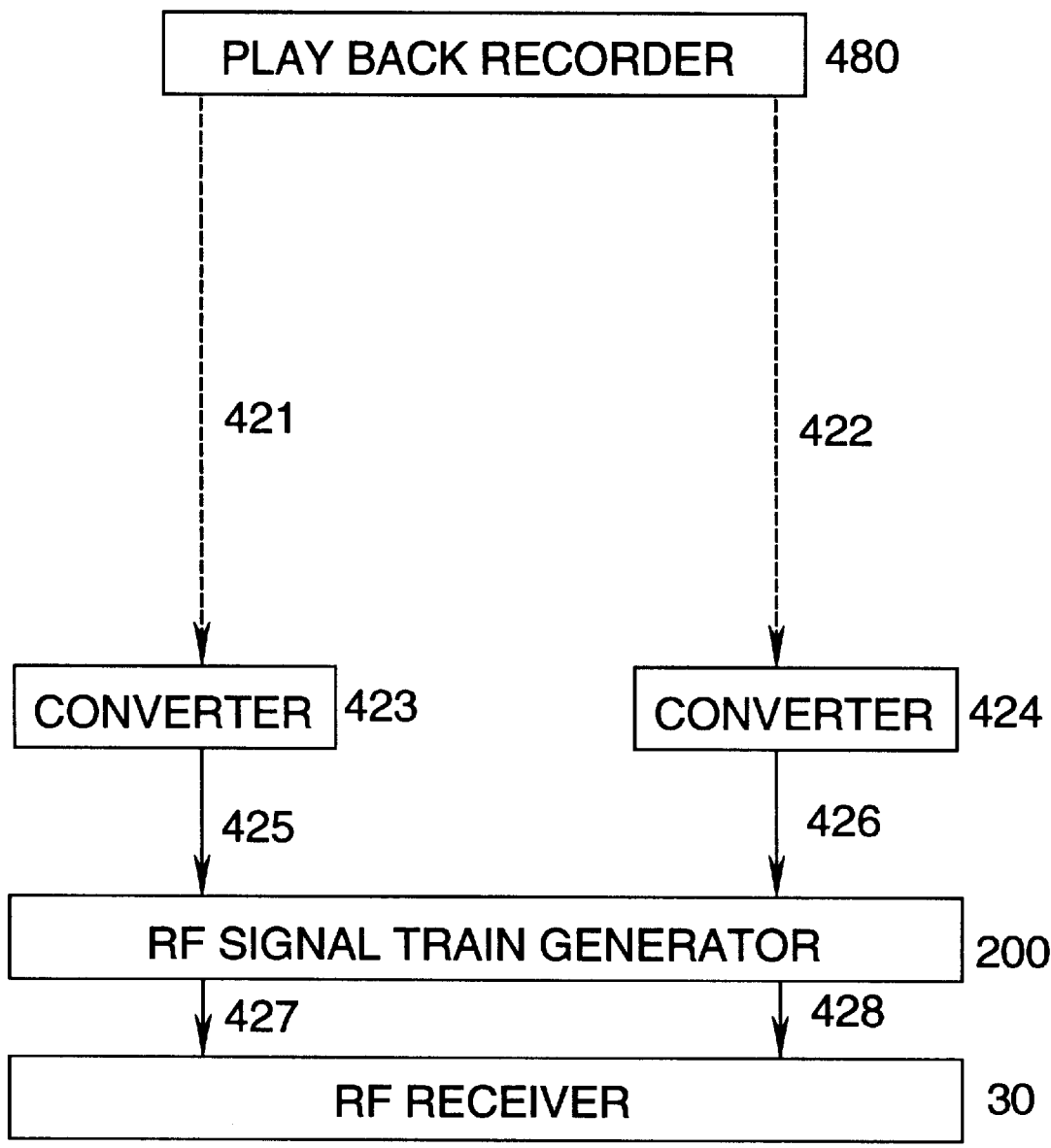
FIG. 4 shows a block diagram of an interferoceiver, which comprises a recording device, for use in fabricating embodiments of the present invention.

FIG. 4 shows a block diagram of an interferoceiver, which comprises a recording device, for use in fabricating embodiments of the present invention. As shown in FIG. 4, the interferoceiver comprises of play back recorder 480, converters 423 and 424, RF signal train generator 200, and RF receiver 30. Play back recorder 480 is well known to those of ordinary skill in the art. As those of ordinary skill in the art will readily appreciate, embodiments of the present invention may comprise an optical fiber RF storage subsystem for temporal alignment of two input pulses.

Transient pulse signals from a system under test were stereoscopically prerecorded. The recorded signals can be a pair of transient pulse signals observed at two different angles or instants from a system under test. They may be a pair of reference pulse signals from a source and transient pulse signals from the system under test. Stereoscopic recording is well known to those of ordinary skill in the art. During an operation, play back recorder 480 plays back each individual pair of stereoscopically recorded transient pulse signals, and applies two signals from the pair to two paths 421 and 422 for transit to converters 423 an d 424. Converters 423 and 424 then use the signals from paths 421 a nd 422 as inputs and convert them respectively to optical RF signals. Converters 423 and 424 further apply optical RF signals respectively from paths 421 and 422 to optical fiber paths 425 and 426 for transit to RF signal train generator 200. RF signal train generator 200 uses optical RF signals as input and out puts two pulse trains with respective to optical RF signals from paths 425 and 426. RF signal train generator 200 further applies two pulse trains respectively to optical fiber paths 427 and 428 for transit to RFR 30. RFR 30 uses pulse trains from optical fiber paths 427 and 428 as inputs to process these two pulse trains.

The disparity between the time needed to process a transient event and the rapid occurrence of some transient events creates difficulties for an online interferoceiver to capture all transient events. We may use static analog or digital recording means to resolve the disparity. Interferoceivers with a help of static recording means as depict in FIG. 4 will be extremely versatile apparatus in investigating acoustical and low frequency transient phenomena. We use static means to record each transient event on-line and use interferoceivers to analyze each recorded event off-line. The disparity is then resolved. As those of ordinary skill in the art will readily appreciate, the versatility of these interferoceivers evolves with the technology on static recording.

As those of ordinary skill in the art will readily appreciate, embodiment of interferoceiver 400 is also useful for analyzing high frequency transient phenomena. Although it is difficult for static means to record all intrinsic features of a high frequency transient phenomenon, but we are still able to record some of these features after frequency down converting.

Figure 5:
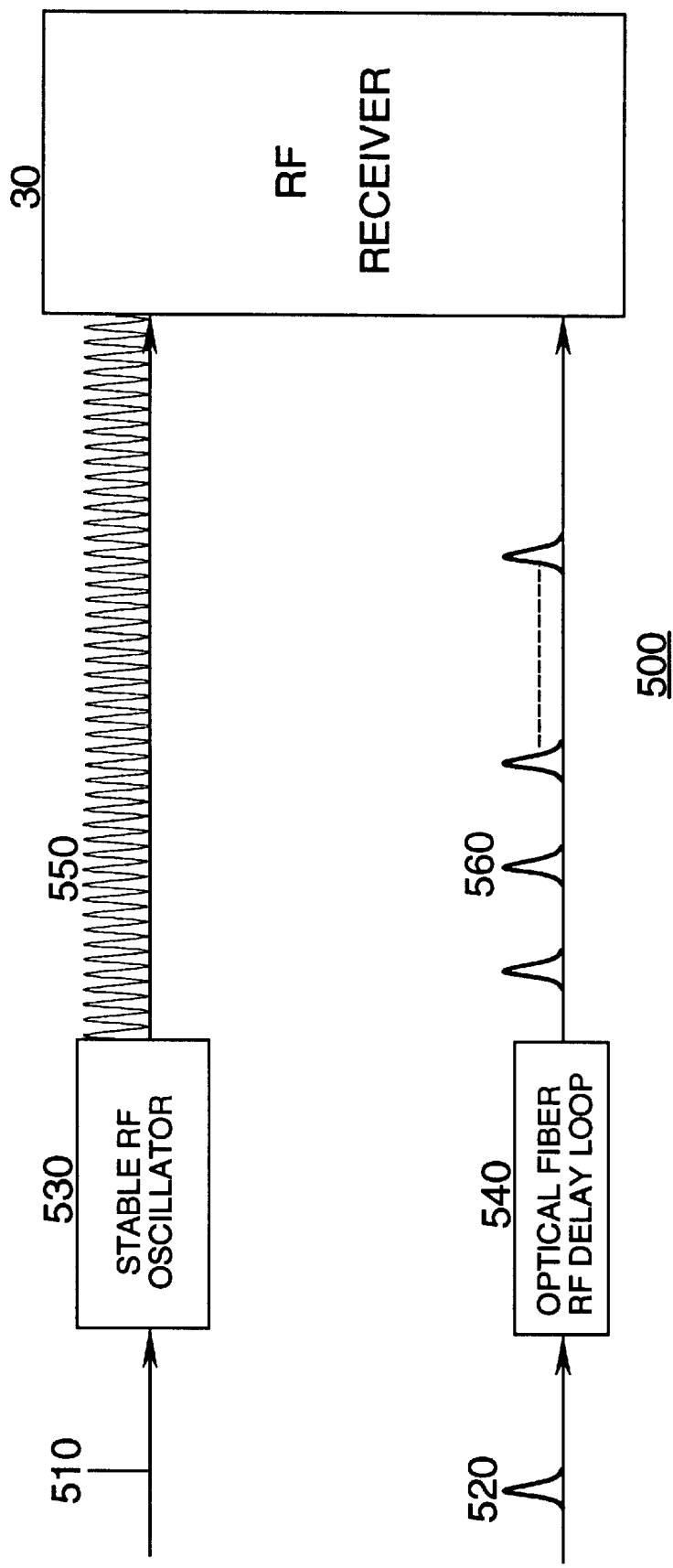
FIG. 5 shows a block diagram of an RF signal train generator, which comprises an optical fiber loop and a stable RF oscillator, for use in fabricating embodiments of the present invention.

FIG. 5 shows a block diagram of an RF signal train generator, which comprises an optical fiber RF delay loop and a stable RF oscillator, for use in fabricating embodiments of the present invention. As shown in FIG. 5, an RF pulse 520 is applied as inputs to optical fiber RF delay loop 540. So as not to loose clarity, optical fiber RF up and down converters, and low noise amplifiers have not been depicted in FIG. 5. Loop 540 uses pulse 520 as input to produce its replicas, which form RF pulse train 560. Meanwhile stable RF oscillator 530 under command and control signal 510 starts to oscillate and generates a continuous RF wave 550. RFR 30 uses continuous RF wave 550 as a reference to process RF pulse train 560. Stable RF oscillator 530 is an apparatus, which is well known to those of ordinary skill in the art. As those of ordinary skill in the art will readily appreciate, embodiments 500 will eliminate the alignment problems associated with two optical fiber RF delay loops.

Figure 6:
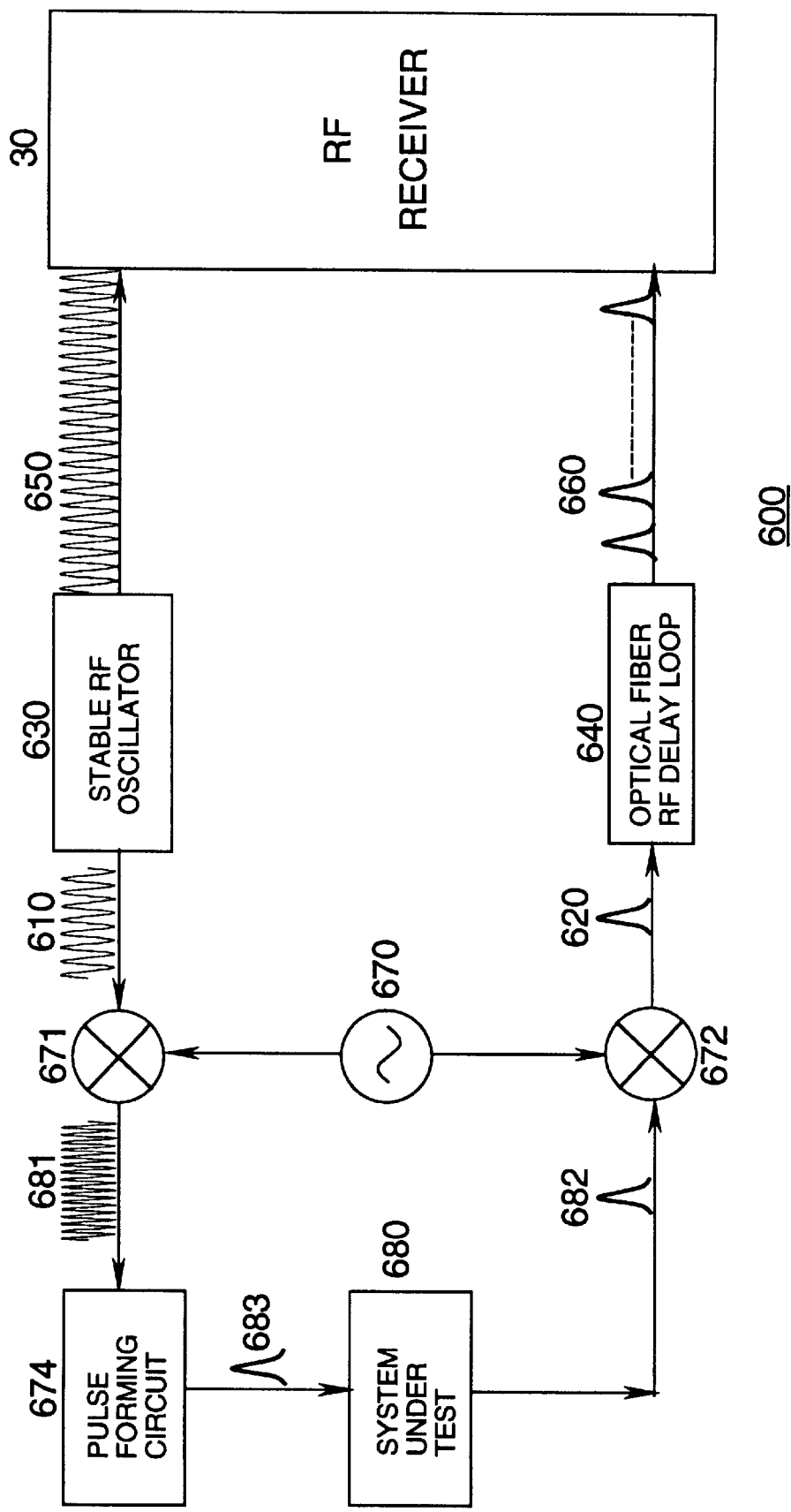
FIG. 6 shows a block diagram of an interferoceiver, which comprises an RF signal train generator as depicted in FIG. 5, for use in fabricating embodiments of the present invention.

FIG. 6 shows a block diagram of an interferoceiver, which comprises an RF signal train generator as depicted in FIG. 5, for use in fabricating embodiments of the present invention. So as not to lose clarity, phase lock loops, band limited filters, comb generators, RF amplifiers, up and down converters, and other necessary components are not depicted in FIG. 6. Inserting these components back to proper places in FIG. 6 are well known to those of ordinary skill in the art. As shown in FIG. 6, stable RF oscillator 630 emits a continuous RF wave 610 and sends the emitted wave to mixer 671. Meanwhile, stable local oscillator 670 also emits a continuous RF wave and sends the emitted wave to mixer 671. Mixer 671 uses continuous RF waves from stable RF oscillator 630 and stable local oscillator 670 as inputs, and outputs frequency shifted continuous RF waves 681 to pulse forming circuit 674. Using wave 681 as input, pulse forming circuit 674 generates RF pulse 683, which then transits through system under test 680. As those of ordinary skill in the art will readily appreciate that RF pulse 683 will interact with system under test 680, and RF pulse 682 emitted from system under test 680 is tainted with intrinsic characteristics of system 680. Mixer 672 uses a continuous RF wave from stable local oscillator 670 and RF pulse 682 as inputs, and outputs frequency shifted RF pulse 620. Optical fiber RF delay loop 640 uses pulse 620 as input to produce its replicas, which form RF pulse train 660. Meanwhile stable RF oscillator 630 also generates a continuous RF wave 650. RFR 30 uses continuous RF wave 650 as a reference to process RF pulse train 660. Mixers 671 and 672, stable local oscillator 670, and pulse forming circuit 670 are apparatus, which are well known to those of ordinary skill in the art.

As those of ordinary skill in the art will readily appreciate, embodiment of interferoceiver 600 has advantages as well as disadvantages. The embodiment is simple in design and easy to operate, since we have more experience in RF technology than in fiber optics. However, RF pulse 682 may lose its important intrinsic characteristics during mixing. In low frequency applications, we can suppress the disadvantages by removing mixers 671 and 672, and stable local oscillator 670.

Most common Doppler radars use stable oscillators to maintain their coherence. As those of ordinary skill in the art will readily appreciate, embodiments 600 of the present invention will provide a simple upgrade to these Doppler radars. The upgraded Doppler radars need not operate at high pulse repetition rates. The vulnerability of these radars will be suppressed and electromagnetic interference with other RF systems reduced. As those of ordinary skill in the art will further appreciate, the upgraded Doppler radars will have better capabilities in rejecting clutter contaminations.

Figure 7:
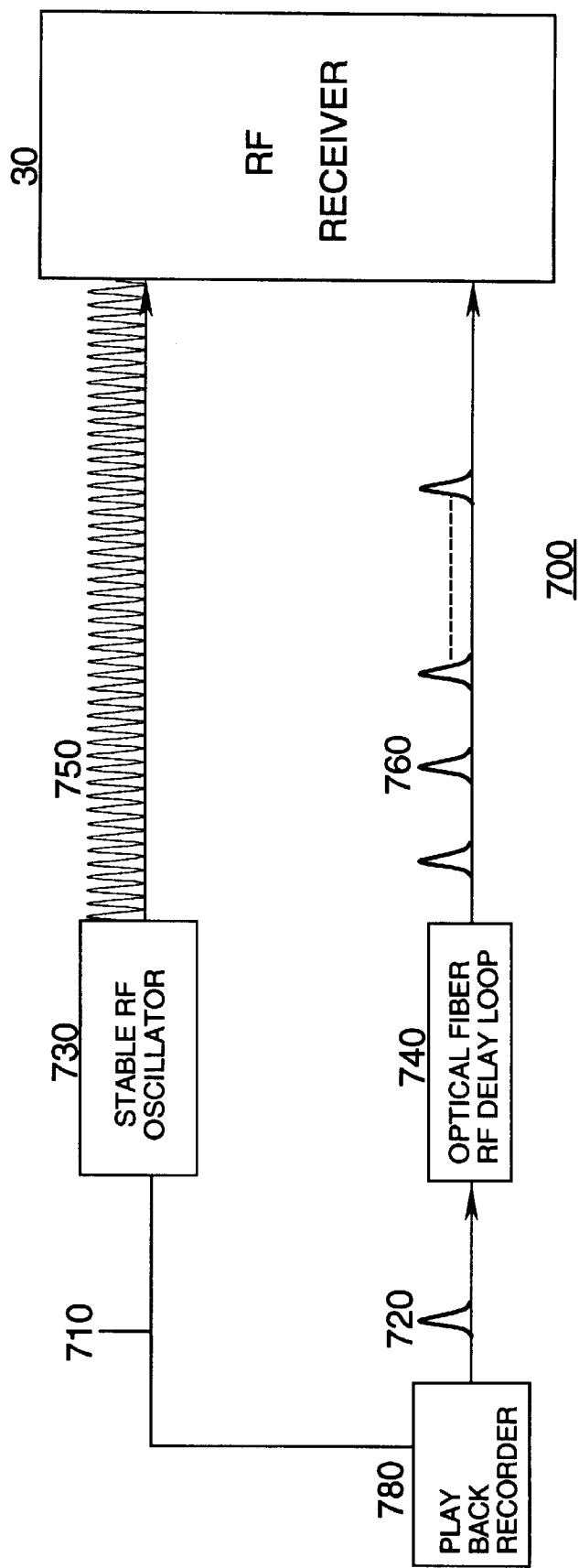
FIG. 7 shows a block diagram of an interferoceiver, which comprises a recording device, for use in fabricating embodiments of the present invention.

FIG. 7 shows a block diagram of an interferoceiver, which comprises a recording device, for use in fabricating embodiments of the present invention. As shown in FIG. 7, play back recorder 780 plays back recorded transient pulse signal 720, and sends out command control signal 710. Optical fiber RF delay loop 740 uses pulse 720 as input to produce its replicas, which form RF pulse train 760. Meanwhile stable RF oscillator 730 under command and control signal 710 starts to oscillate and generates a continuous RF wave 750. RFR 30 uses continuous RF wave 750 as a reference to process RF pulse train 760. As those of ordinary skill in the art will readily appreciate, play back recorder 780 can wait for RFR 30 to process RF pulse train 760. All recorded signals will be processed without omission.

As those of ordinary skill in the art will further appreciate, the carrier frequency for transient pulse signal 720 and the frequency of continuous RF wave 750 should be compatible.

The compatibility is not a problem in active recordings, where the transient events were created by known external RF pulses. One has to chose stable RF oscillator 730 properly in order to satisfy compatibility requirements in passive recording, where the transient events were created by other means.

Most ultrasonic imaging systems operate at frequency below 7 MHz. Their signals can be faithfully recorded. Embodiments 700 of the present invention will provide simple and low cost upgrade to these systems in operation. As those of ordinary skill in the art will appreciate, the upgrade systems will provide clear off-line images.

ADVANTAGES AND OBJECTIVES

Embodiments of the present invention will furnish advanced means for tuning and realigning RF signal train generators and interferoceivers. The specification teaches the use of a tunable optical fiber to modify interference variations as observed by interferoceivers. The variations alleviate stringent requirements on RF signal train generators, and provide interferoceivers with a mean for determining the carrier frequency of a single transient RF pulse. As those of ordinary skill in the art will readily appreciate, embodiments of the present invention provide added upgrades to embodiments of parent applications. The new generators and interferoceivers gain more functional diversity and performance.

Embodiments of the present invention will furnish means for analyzing transient phenomena off-line. The specification teaches a use of static means for on-line recording of transient events, and the uses of RF signal train generators and interferoceivers for analyzing the transient events from the records. The teaching alleviates a disparity problem between the time needed to process a transient event and the rapid occurrence of some transient events. As those of ordinary skill in the art will readily appreciate, embodiments of the present invention provide added upgrades to embodiments of parent applications. The new interferoceivers gain the ability in keeping up with the rapid occurrence of transient events.

Interior parts of a human body is not rigid and nor static. Even minor movements cause blurring in an ultrasonic image of any interior body parts. Furthermore ultrasonic waves suffer from the effects of refraction and diffraction inside the human body. Compounding with a need of multiple ultrasonic transducers to collect needed information for the image reconstruction, a large number of RF signal train generators and interferoceivers for an on-line operation would be required to produce a clear ultrasonic image. As those of ordinary skill in the art will further appreciate, embodiments of the present invention provide optimum alternative means, by collecting all relevant information on-line and analyzing the information off-line, for imaging interior body parts of a human without motion blurring.

Embodiments of the present invention will furnish means for determining the carrier frequency of a single pulse. The determination, with an aid of spatially distributed multiple transducers, sensors, or antennas in passive observations leads to means for imaging transient events. Embodiments of the present invention, with the help of multiple optical fiber loops and recorders, will lead to images of many transient and non-repeatable phenomena in acoustics, electromagnetism, and optics.

Those phenomena in acoustics are the blasts, explosions, thunders, earth quake etc . . . Those phenomena in electromagnetism are electromagnetic pulses from lightning, violent electromagnetic discharge, electromagnetic pulse of opportunity, electromagnetic pulses emitted by nuclear blasts and celestial objects, etc . . . Those phenomena in optics are the lights emitted or scattered by atoms and molecules in a turbulent media of burning, discharge, plasma, lightning, etc . . . Furthermore, all the above mentioned phenomena are well know to those of ordinary skill in the art.

Interferoceivers, which are fabricated in accordance with the present invention, enable one further to obtain synthetic aperture images without stable sources. For example in exploration for new resources, one can now use explosive charge initiated shock waves as illuminators to image the structural profiles of strata. In conventional methods, one is only able to estimate depths from the earth surface to changes in strata. One can also use underwater high explosives or even earth quakes to image geological structures hundreds of meters below the sea floor. As those of ordinary skill in the art will readily appreciate, embodiments of the present invention will provide us with more precision information than conventional methods.

Embodiments of the present invention will open a new road in using chaotic RF sources to advance the technology of synthetic aperture radars (SAR). The new synthetic aperture radars will be able to yield both SAR and inverse SAR images simultaneously. The powerful magnetron is such a stable source. As those of ordinary skill in the art will further appreciate, embodiments of the present invention will provide with new means in producing SAR images with RF pulses of opportunity.

Many analog and digital means are available to record low frequency RF signals at the present. The recording technology evolves rapidly, and new means will be available to record RF signals with higher frequencies. Embodiments of the present invention, with a help of new means in recording, will advance the art of interferoceivers to uncover high frequency intrinsic characteristics of transient events occurred at high occurrence rates.

SUMMARY, RAMIFICATION, AND SCOPE

The ability of tunable RF signal train generators in varying the dynamical delays between replicas leads to means for imaging chaotic sources and for imaging various environments with the aid of chaotic sources. Those skilled in the art readily recognize that embodiments of the present invention may be made without departing from its teachings. For example, RF signal train generators may have many designs as well as different variations. The present invention has provided more designs and variations than in the parents applications. As the technology evolves, instead of optical fibers, new means may become available to us for designing new variations of RF signal train generators and interferoceivers. Thus the scope of the invention should be determined by appended claims and their legal equivalent, rather by the examples presented here.

What is claimed is:

1. An interferoceiver comprising an RF signal train generator; wherein the RF signal train generator comprises one or more RF delay loops; wherein the RF signal train generator further comprises means for receiving RF signals from a source; wherein the RF delay loops comprise means for storing received RF signals, for regenerating replicas of stored RF signals, for aligning and varying alignments of regenerated replicas.

2. The interferoceiver of claim 1 wherein said RF delay loops comprise means for varying electrical lengths of delay loops.

3. The interferoceiver of claim 2 further comprising an RF receiver; wherein the RF receiver comprises means for receiving the replicas of stored RF signals; and means for processing the replicas from one stored RF signal with a reference to the replicas from another stored RF signal.

4. The interferoceiver of claim 3 wherein said RF receiver further comprises means for determining carrier frequencies of the stored RF signals and differences among the carrier frequencies.

5. The interferoceivers of claim 1 further comprises means for aligning received RF signals and for determining time delay adjustments in alignment.

6. The interferoceivers of claim 1 further comprises means for recording analog or digital signals from said source; means for playing back the recorded signals; means for converting the played back signals to RF signals, and means for sending the converted RF signals to the RF signal train generator.

7. The interferoceiver of claim 1 further comprises means for processing the RF signals from the RF signal train generator; and means for forming images from said RF signals.

8. The interferoceivers of claim 7 further comprises means for processing Doppler frequency shift dependence in the RF signals from the RF signal train generator; and means for forming images from processed RF signals.

9. A method for operating an interferoceiver comprising the steps of:
   (a) receiving RF signals from a source;
   (b) storing RF signals in one or more RF delay loops;
   (c) regenerating replicas of stored RF signals;
   (d) aligning and varying alignments of regenerated replicas.

10. The method of claim 9 further comprises the step of:
    (e) varying electric lengths of the RF delay loops.

11. The method of claim 10 further comprising the steps of:
    (f) receiving the generated replicas by an RF receiver;
    (g) processing the replicas from one stored RF signal with a reference to the replicas from another stored RF signal at the RF receiver.

12. The method of claim 11 further comprising the steps of:
    (h) determining carrier frequencies of the stored RF signals;
    (i) determining differences among the carrier frequencies.

13. The method of claim 9 further comprising the steps of:
    (e) aligning received RF signals from said source;
    (f) determining time delay adjustments in alignment.

14. The method of claim 9 further comprising the steps of:
    (e) recording analog or digital signals from said source;
    (f) playing back the recorded signals;
    (g) converting the played back signals to RF signals;
    (h) sending the RF signals to the RF signal train generator.

15. The method of claim 9 further comprising the steps of:
    (e) processing the RF signals from the RF signal train generator;
    (f) forming images from said RF signals.

16. The method of claim 9 further comprising the steps of:
    (e) processing Doppler shift dependence in the RF signals from the RF signal train generator;
    (f) forming images from processed RF signals.

17. An interferoceiver comprising an RF signal train generator; wherein the RF signal train generator comprises one or more delay loops and a stable RF oscillator; wherein the RF signal train generator further comprises means for receiving RF signals from a source; wherein the delay loops comprise means for storing received RF signals, and for regenerating replicas of stored RF signals; wherein the stable RF oscillator comprises means for generating continuous RF signals.

18. The interferoceiver of claim 17 further comprising an RF receiver; wherein the RF receiver comprises means for receiving the replicas of a stored RF signal from a delay loop; and for receiving continuous RF signals from the stable RF oscillator; the RF receiver further comprises means for processing the replicas with a reference to the continuous RF signals.

19. The interferoceiver of claim 18 wherein said RF receiver further comprises means for determining frequency differences between the replicas and continuous RF signals.

20. The interferoceiver of claim 18 further comprises means for removing Doppler shifts in the RF signals from the RF signal train generator; and means for forming images from the replicas.

* * * * *